(12) United States Patent
Meller et al.

(10) Patent No.: US 6,429,421 B1
(45) Date of Patent: Aug. 6, 2002

(54) FLEXIBLE FIBER OPTIC MICROBEND DEVICE, WITH INTERLOCKING FLEXIBLE FIBERS, SENSORS, AND METHOD USE

(75) Inventors: Scott A. Meller, Blacksburg; Kent A. Murphy, Troutville; Mark E. Jones, Blacksburg, all of VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/489,768

(22) Filed: Jan. 21, 2000

(51) Int. Cl.[7] .................................................. G01J 1/04
(52) U.S. Cl. ...................... 250/227.14; 73/800; 73/818; 385/12
(58) Field of Search ........................ 250/227.14, 227.15, 250/227.16; 73/812, 849, 852, 818, 800; 385/12, 15, 901

(56) References Cited

U.S. PATENT DOCUMENTS

| | | | |
|---|---|---|---|
| 3,891,302 A | 6/1975 | Dabby et al. | |
| 4,342,907 A | 8/1982 | Macedo et al. | |
| 4,421,979 A | 12/1983 | Asawa et al. | |
| 4,443,700 A | 4/1984 | Macedo et al. | |
| 4,449,210 A | 5/1984 | Myer | |
| 4,459,477 A | 7/1984 | Asawa et al. | |
| 4,488,040 A | 12/1984 | Rowe | |
| 4,530,078 A | 7/1985 | Lagakos et al. | |
| 4,678,903 A | 7/1987 | Wlodarczyk et al. | |
| 4,749,246 A | 6/1988 | Epworth et al. | |
| 4,795,232 A | 1/1989 | Persson | |
| 4,830,461 A | 5/1989 | Ishiharada et al. | |
| 4,846,547 A | 7/1989 | Falco et al. | |
| 4,871,908 A | 10/1989 | Skuratovsky et al. | |
| 4,891,511 A | 1/1990 | Reed | |
| 4,924,970 A | 5/1990 | Seals et al. | |
| 4,927,232 A | 5/1990 | Griffiths | |
| 4,932,262 A | 6/1990 | Wlodarczyk | |
| 4,932,263 A | 6/1990 | Wlodarczyk | |
| 4,990,769 A | * 2/1991 | Hazan et al. | 250/227.16 |
| 5,013,908 A | 5/1991 | Chang | |
| 5,118,931 A | 6/1992 | Udd et al. | |
| 5,193,129 A | 3/1993 | Kramer | |
| 5,196,694 A | * 3/1993 | Berthold et al. | 250/227.16 |
| 5,260,566 A | 11/1993 | Reed | |
| 5,293,039 A | 3/1994 | Mongiols | |
| 5,321,778 A | 6/1994 | Com-Nougue et al. | |
| 5,411,566 A | 5/1995 | Poole | |
| 5,419,636 A | 5/1995 | Weiss | |
| 5,421,195 A | 6/1995 | Wlodarczyk | |
| 5,562,027 A | 10/1996 | Moore | |
| 5,592,875 A | 1/1997 | Moschel | |
| 5,600,125 A | 2/1997 | Poorman et al. | |
| 5,694,497 A | 12/1997 | Sansone | |
| 5,714,680 A | 2/1998 | Taylor et al. | |
| 5,913,245 A | * 6/1999 | Grossman | 73/800 |
| 5,926,584 A | * 7/1999 | Motzko et al. | 385/13 |

* cited by examiner

*Primary Examiner*—Stephone Allen
*Assistant Examiner*—Eric Spears
(74) *Attorney, Agent, or Firm*—Joy L. Bryant

(57) ABSTRACT

A flexible microbend device for attachment to an optical fiber is provided. The device comprises an upper bending element grid having at least one flexible element and a lower bending element grid having at least one flexible element. The upper bending element grid alternately engages the lower bending element grid. The flexible microbend device is attached to an optical fiber to form a sensor. The sensor may be either embedded in a host material or attached to a structure to detect various stresses or strains.

17 Claims, 6 Drawing Sheets

FLEXIBLE FIBER OPTIC MICROBEND DEVICE, WITH INTERLOCKING FLEXIBLE FIBERS, SENSORS, AND METHOD USE

FIELD OF THE INVENTION

The present invention relates to fiber optic devices. In particular, it relates to a flexible microbend device that may be attached to an optical fiber and used in a sensor arrangement for measuring internal strain in a structure.

BACKGROUND OF THE INVENTION

Optical fibers are used to convey light between a light source and a light detector. Light in the fiber can be modulated by bending or otherwise distorting the fiber. This produces a modulated signal which can be picked up and processed by the light detector.

Microbend devices may be used to induce distortions in a fiber causing the light passing through the fiber to be modulated at a frequency corresponding to the force applied to the device. Typically, the device is applied to the fiber such that it surrounds the fiber.

One known device is a two jaw corrugated arrangement which squeezes an optical fiber to modulate the light signal passing therethrough. Macedo et al. (U.S. Pat. No. 4,342,907) describes such a device where an upper piece is firmly connected to an enclosure by a support. A lower piece was attached to an elastic membrane. When either a static pressure or dynamic time varying pressure reaches the membrane, it deflects pushing the lower piece, toward the upper piece, thus deforming the optical fiber which is held against the ridges of the device. They also describe another approach in U.S. Pat. No. 4,443,700 where two steel pieces having corrugated like surfaces with interleaving ridges form a vise which would be used to squeeze and thus deform the fiber. Such devices fail to have the compactness and flexibility desired for measuring forces internally in a structure.

Kramer (U.S. Pat. No. 5,193,129) introduced microbends by interweaving an optical fiber through rungs of a ladder-like structure, encapsulating it in a foam-like material, and surrounding it with a sheath. Light transmitted through the optical fiber is diminished to a value less than a threshold value upon the occurrence of microbending caused by pressure applied at any location along the length thereof. The rungs of the ladder structure are sized and spaced to provide a proper locus about which microbending may be produced. Sansone (U.S. Pat. No. 5,694,497) points out one of the deficiencies of this sensor by stating that it must use part of the structure it is embedded in to complete the sensor design. In fact, the utility of this type of sensor is limited in that it must be woven into the substrate or structure being measured and cannot be later repositioned as needed.

Udd et al. (U.S. Pat. No. 5,118,931) introduced microbends into their sensor system by melting the optical fiber and pulling simultaneously to give the fiber a smaller diameter. Lengths of this fiber were spliced into the unmelted fiber to produce the sensor. Deformation of the fiber affects propagation of light therethrough, permitting detection based upon detected changes in light throughput. As with the Kramer device, the deficiency in this design is that once spliced into the fiber, there is no way to later reposition the structure.

Sansone (U.S. Pat. No. 5,694,497) describes an intrinsically self-deforming microbend deformer. In this device, the fiber is twisted about itself. At least one twisted section acts as an intrinsically self-deforming microbend deformer. The problem with this device is that there is no way to obtain a fixed period and/or thus be able to adjust the sensitivity of the sensor.

An object of the present invention is to provide a microbend device that may be removed and reattached to an optical fiber along its length.

Another object of the present invention is to provide a microbend device that is flexible.

Another object of the present invention is to provide a sensor that employs a flexible microbend device, such that the sensor is intensity-based.

Another object of the present invention is to provide a method for using a sensor that employs a flexible microbend device, such that the method is used to measure either radial or linear forces.

SUMMARY OF THE INVENTION

By the present invention, a flexible microbend device for attachment to an optical fiber is provided. The device comprises an upper bending element grid having at least one flexible element and a lower bending element grid having at least one flexible element. Each upper bending element grid alternately engages each lower bending element grid.

When the device is attached to an optical fiber, it forms a fiber optic microbend sensor. The optical fiber is positioned between each flexible element of the upper bending element grid and each flexible element of the lower bending element grid such that each flexible element alternates between the upper and the lower bending element grids.

In use, the sensor is either attached to a surface of a structure or embedded in a host material. Optical power is introduced to the microbend sensor and the reflected light is monitored with a detector.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1A:
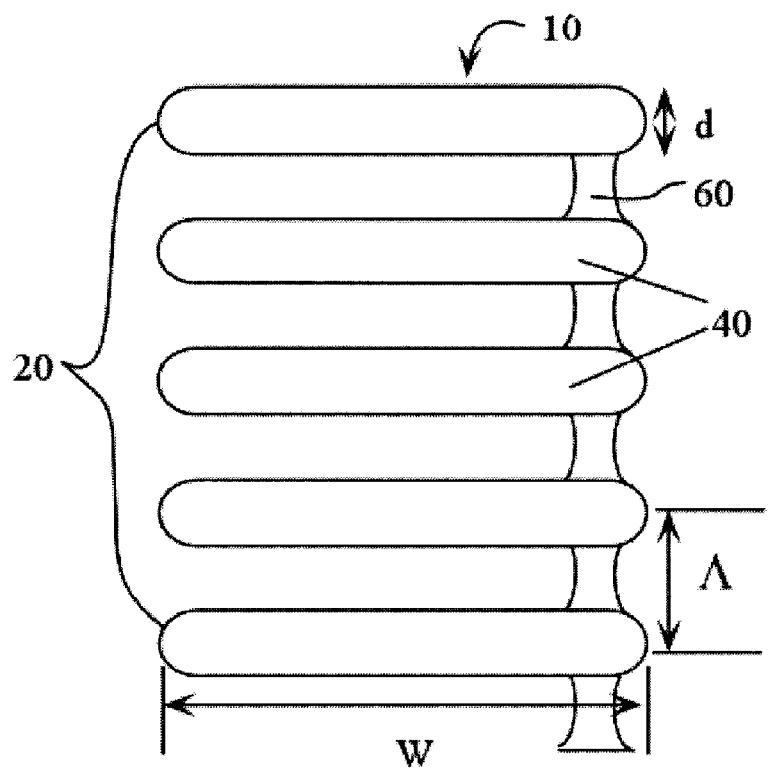
FIG. 1A is a top view of the upper bending element grid of the flexible microbend device of the present invention.
Figure 1B:
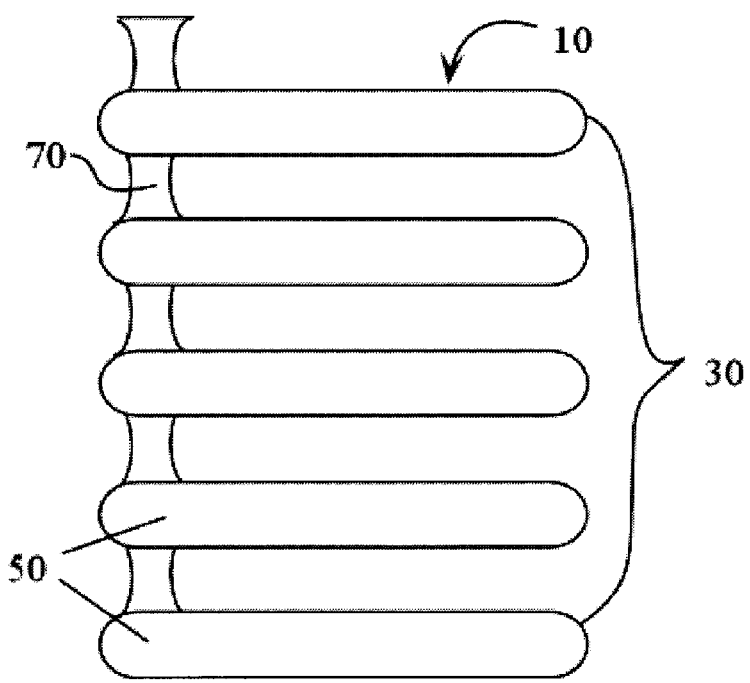
FIG. 1B is a top view of the lower bending element grid of the flexible microbend device of the present invention.

Referring now to the figures where similar elements are numbered the same throughout, FIGS. 1A and 1B depict the flexible microbend device 10 of the present invention. For the purpose of this specification and the appended claims, by flexible it is meant that the device can undergo a deformation without breaking. Each microbend device 10 comprises an upper bending element grid 20 and a lower bending element grid 30. Although FIG. 1A depicts the upper bending element grid 20 and FIG. 1B depicts the lower bending element grid 30, the two may be reversed. Each bending element grid 20, 30, comprises at least one flexible element 40, 50. Each upper flexible element 40 extends from an upper interlocking member 60, whereas each lower flexible element 50 extends from a lower interlocking member 70. FIGS. 1A and 1B depict a preferred embodiment where each bending element grid 20, 30 comprises a plurality of bending elements 40, 50. However, the invention is operable with the upper bending element grid having only one flexible element and the lower bending element grid having only one flexible element.

Each flexible element has a specific width, w, and diameter, d, and spaced apart a certain distance to form a period Λ. The diameter of the flexible element influences the sensitivity of the device. It was found that the flexible elements having small diameters moved more easily than those of larger diameter. Each flexible element has a stationery position at one end, or at the end where the flexible element is attached to the interlocking member, in order to establish a fixed period Λ. The period depends on whether the optical fiber used in the sensor is to be a single mode optical fiber or a multimode optical fiber. Preferably, the flexible element is prepared from a material selected from the group consisting of: a moldable plastic, micromachined silicon, an elastomer; and silica fiber. An example of silica fiber is a coated optical fiber which is cut to an appropriate length. The interlocking members are preferably prepared from a material selected from the group consisting of: a moldable plastic, micromachined silicon, and an elastomer. If micromachined silicon is used, v-grooves are etched into the silicon to from the interlocking member.

Figure 2A:
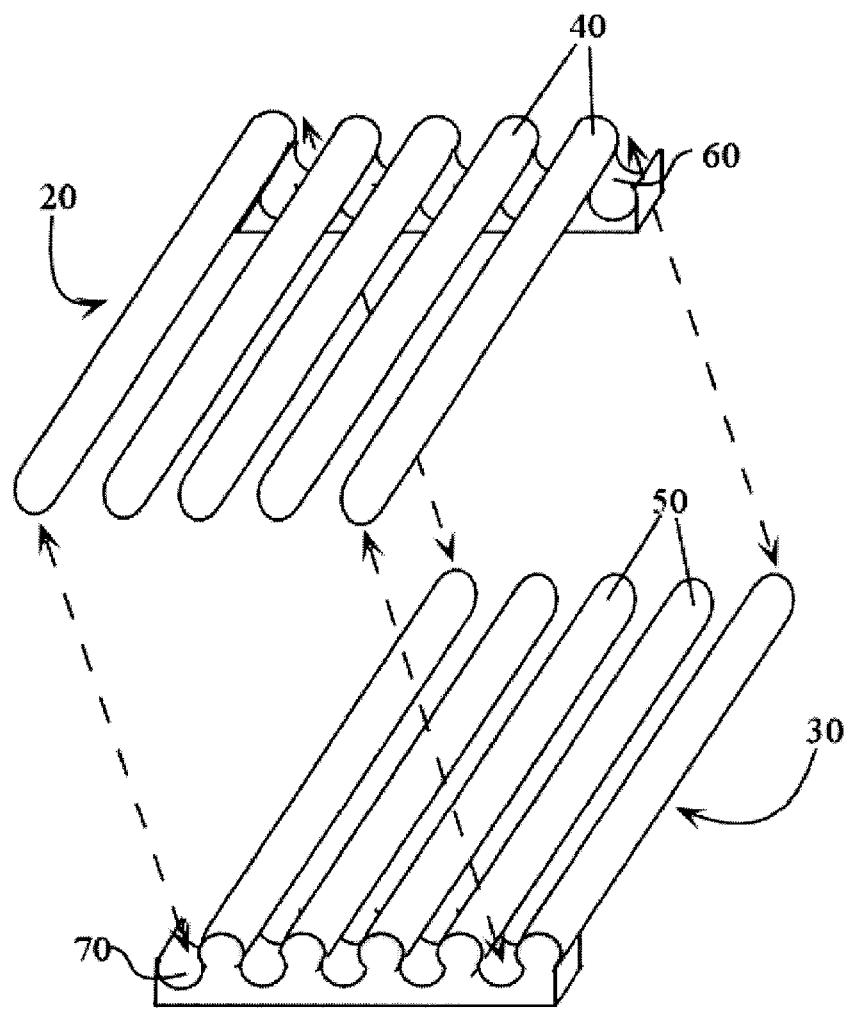
FIG. 2A depicts the assembly of the flexible microbend device.

FIG. 2A depicts how the upper bending element grid 20 is assembled with the lower bending element grid 30 to form the flexible microbend device. The upper bending element grid 20 has at least one upper interlocking member 60 positioned at an end of each flexible element 40. Similarly, the lower bending element grid 30 has at least one lower interlocking member 70 positioned at an end of each flexible element 50. When engaged, each upper interlocking member 60 of the upper bending element grid 20 mates with each respective lower flexible element 50 of the lower bending element grid 30 such that the lower flexible element 50 nests within the upper interlocking member 60. Similarly, each lower interlocking member 70 of the lower bending element grid 30 mates with each respective upper flexible element 40 of the upper bending element grid 20 such that the upper flexible element 40 nests within the lower interlocking member 70. This allows the upper bending element grid 20 to be secured to the lower bending element grid 30. The upper and lower interlocking members 60, 70 are both depicted such that they are on the same side (or bottom) of the device when the device is assembled. However, it is understood that the upper interlocking member 60 could be positioned such that it is on a side opposite from (top side) the lower interlocking member 70, which is on the bottom. Other configurations suitable for the particular application of interest may be used.

Figure 2B:
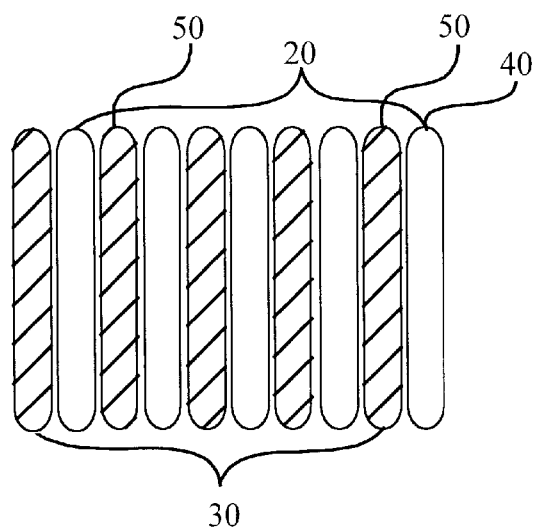
FIG. 2B is a top view of the flexible microbend device when it is assembled.

FIG. 2B depicts the flexible microbend device 10 after it has been assembled. When the upper bending element grid 20 is engaged with the lower bending element grid 30, the flexible elements 40, 50 alternate. More specifically, the upper flexible element 40 is every other flexible element. Such an engagement is defined as an alternate engagement or where the upper bending element grid alternately engages the lower bending element grid.

Figure 3:
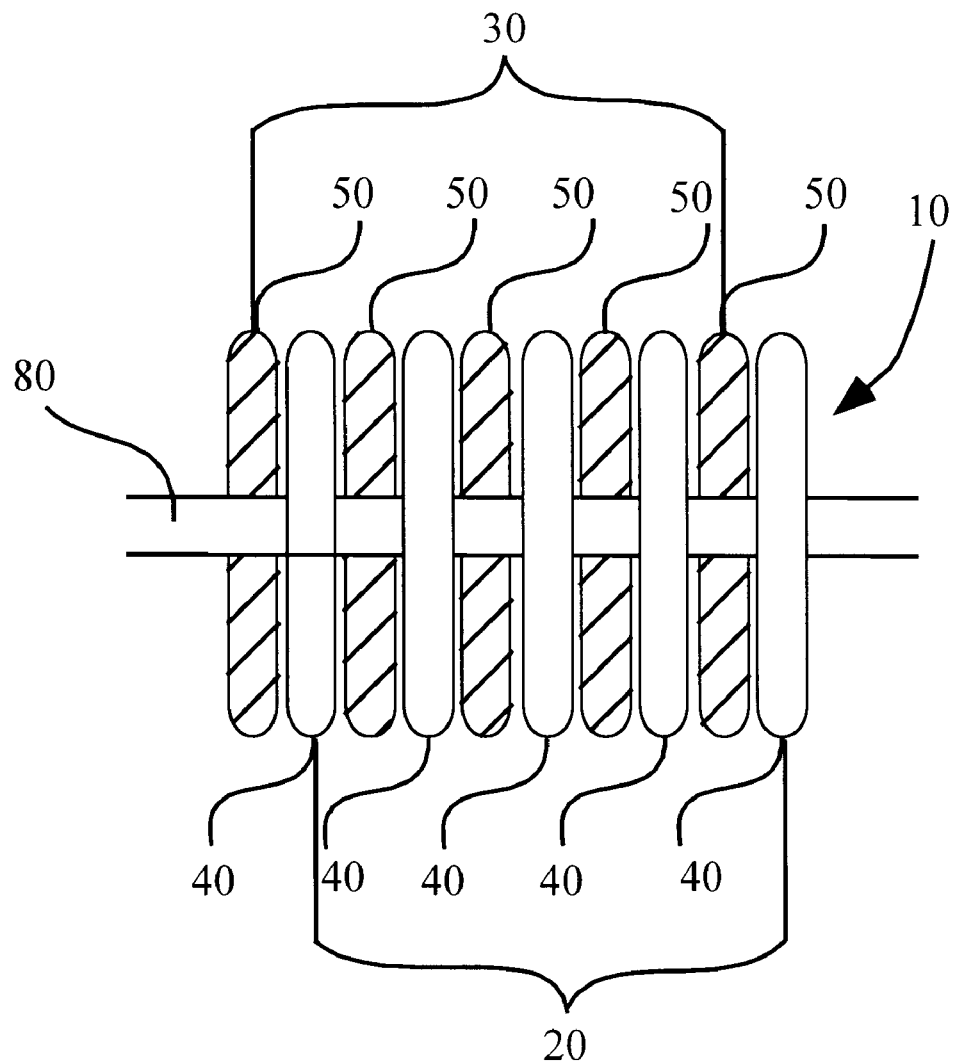
FIG. 3 is a top view of a fiber optic microbend sensor.

FIG. 3 shows how the flexible microbend device 10 may be employed to form a fiber optic microbend sensor. When forming the sensor, an optical fiber 80 is positioned between each flexible element 40 of the upper bending element grid 20 and each flexible element 50 of the lower bending element grid 30. Each flexible element 40 of the upper bending element grid 20 alternately engages each flexible element 50 of the lower bending element grid 30. Note that the optical fiber 80 is sandwiched between the upper and lower flexible elements, 40 and 50, as opposed to weaving the fiber between the flexible elements.

Figure 4A:
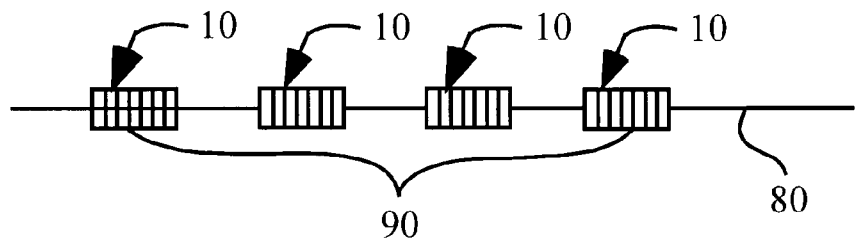
FIG. 4A depicts a sensor array.

FIG. 4A shows how a sensor array 90 is formed by attaching a plurality of flexible microbend devices 10 to an optical fiber 80. Preferably, the array is formed by a single optical fiber passing through multiple flexible microbend devices. However, a plurality of optical fibers and flexible microbend devices may be employed to form a three dimensional array or stack. In a typical application, one may have 21 flexible microbend devices attached to a single optical fiber within a thirty-foot length. The direction of sensitivity is orthogonal to the optical fiber. Either radial or linear forces are applied. As the force moves across the device, the top and bottom bending elements move up and down changing the light intensity detected by the detector. The sensitivity may be varied by the flexible element diameter; by the number of flexible elements comprising the bending element grids; by adjusting the period Λ, or by changing the material properties of an encapsulating material.

The bending element grid has a stationery period. The periodic distance, Λ, is calculated based on the type of optical fiber used for the sensor. If the optical fiber is a multimode optical fiber, the periodic distance, Λ, is defined by the equation:

$$\Lambda = \frac{\pi a}{(\Delta)^{\frac{1}{2}}}$$

$$\Delta = \frac{n_1^2 - n_2^2}{2n_1^2}$$

where: a=radius of the core of the optical fiber
$n_1$=core refractive index
$n_2$=cladding refractive index.
When the optical fiber is a single mode optical fiber, the periodic distance, Λ, is $10\,\mu m \leq \Lambda \leq 150\,\mu m$. By adjusting the periodic distance, one can adjust the sensitivity of the sensor.

Figure 4B:
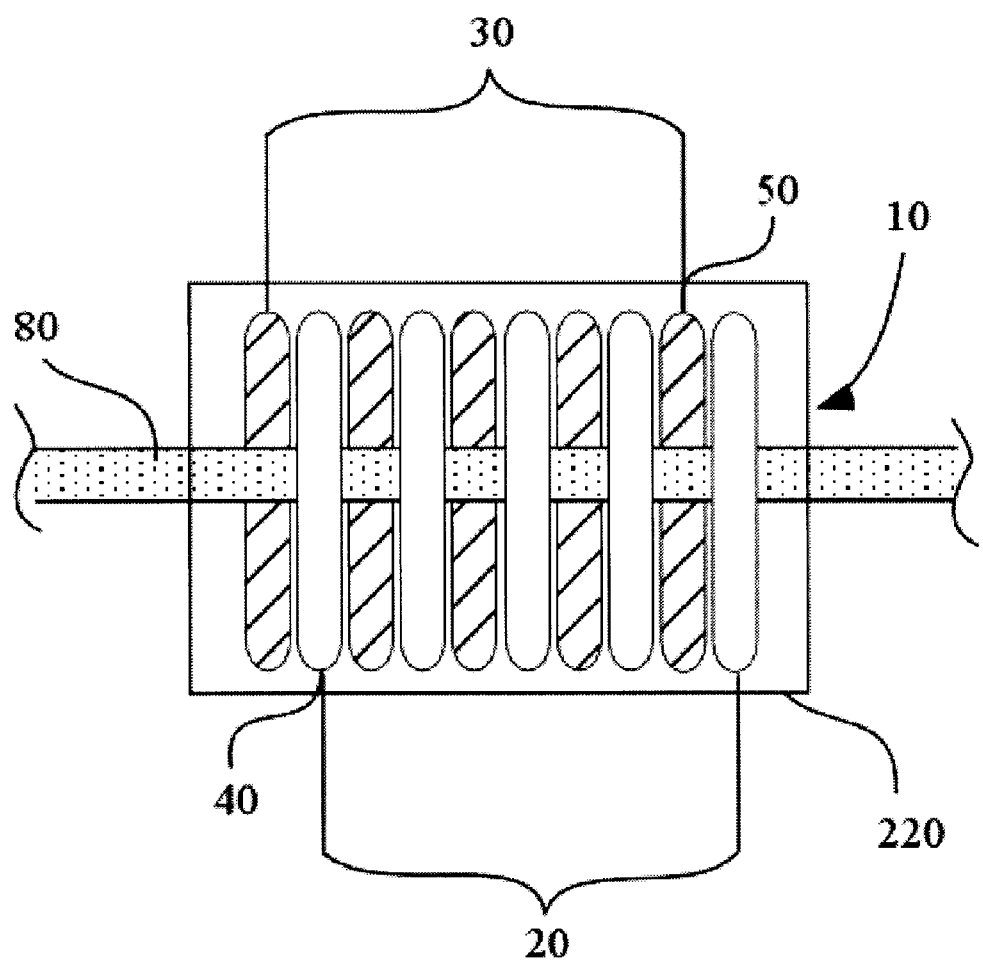
FIG. 4B depicts the sensor encased in a protective covering, such as a vacuum bag.

As previously described, the flexible elements are preferably prepared from a material selected from the group consisting of: a moldable plastic; micromachined silicon; an elastomer; and silica fiber. When an elastomer is the choice material, preferably the elastomer is a polyurethane. As a further embodiment of the invention, the sensor is encapsulated in a material having mechanical properties that are different from those of the flexible elements. For example, the encapsulated material may be selected from the group consisting of: silicone RTV; UV-cured epoxy; an elastomer; and polyurethane. If the sensor is to eventually be embedded in a host material, the encapsulated material must be compatible with the host material. By host material, it is understood that the material may be a material surrounding a structure such as the rubber cover on a roller. Alternatively, the sensor may be encased in a protective covering, such as a vacuum bag 220 (FIG. 4B).

Figure 5A:
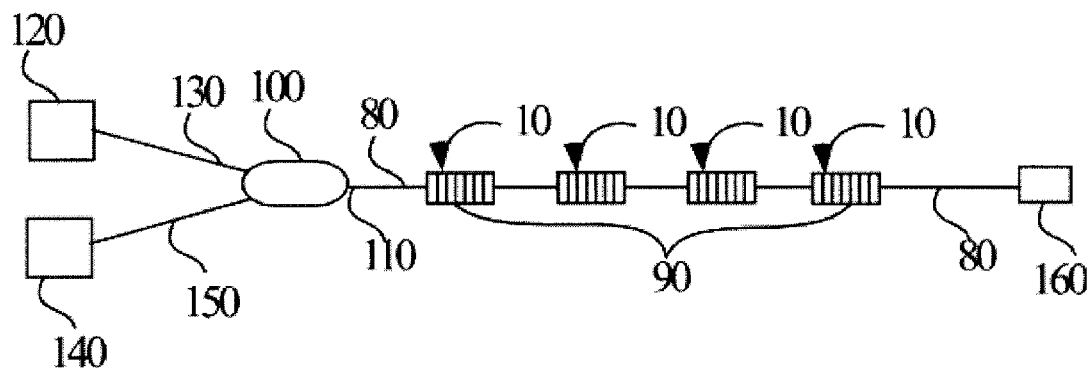
FIG. 5A depicts an optical arrangement for the fiber optic microbend sensor.

FIG. 5A depicts one optical arrangement for the fiber optic microbend sensor. The arrangement comprises an optical coupler 100 having a first end or lead 110 coupled to the optical fiber 80. A light source 120 is coupled to a second end or lead 130 of the optical coupler 100. A detector 140 is coupled to a third end or lead 150 of the optical coupler 100. A reflector 160 is positioned at an end of the optical fiber 80 opposite from the light source 120.

Figure 5B:
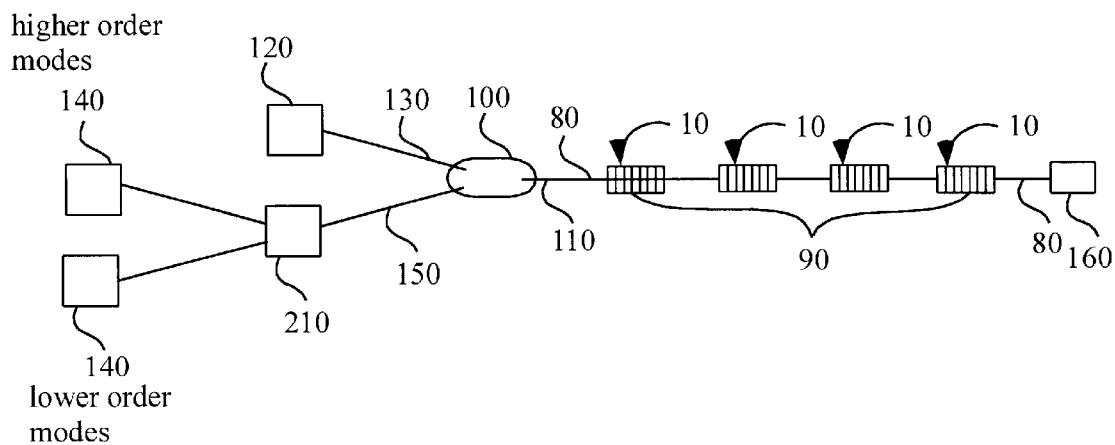
FIG. 5B depicts an alternative optical arrangement for the fiber optic microbend sensor.

FIG. 5B shows an alternate embodiment for the optical arrangement where a fused, biconical, tapered device 210 is disposed between the optical coupler 100 and the detector 140. The fused, biconical, tapered device 210 separates high and low order modes from an optical signal.

Figure 6:
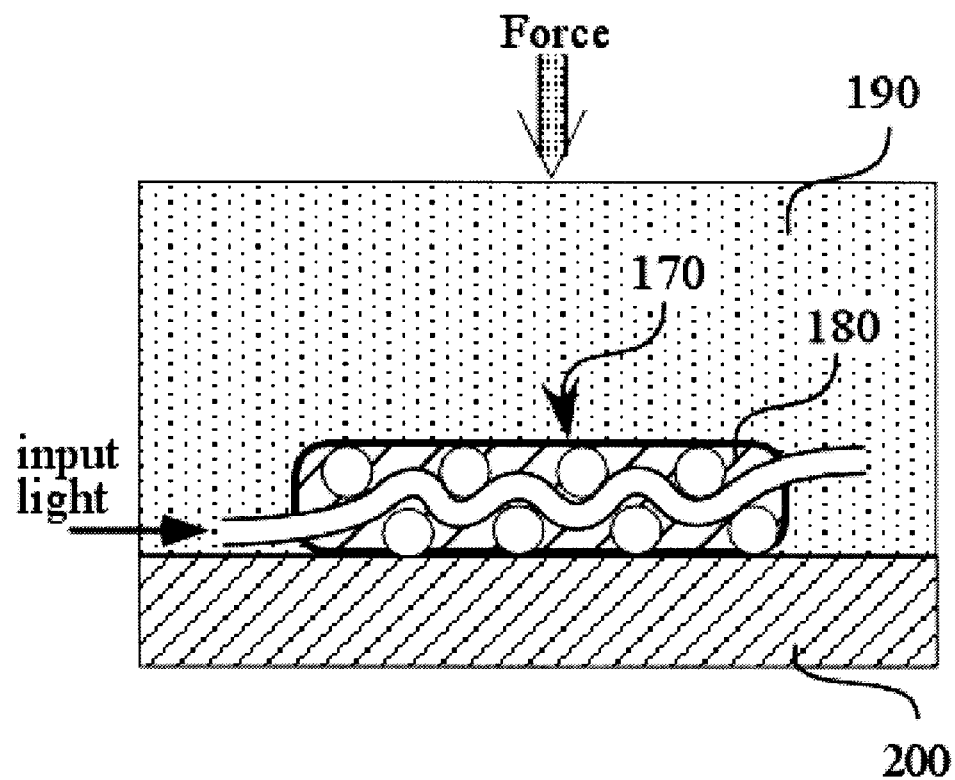
FIG. 6 is side view of a fiber optic microbend sensor which is encapsulated and embedded in a host material.

In one application, the fiber optic microbend sensor is attached to a surface of a structure. Optical power is introduced to the microbend sensor and reflected light is monitored with the detector. When the sensor is attached to the surface of a structure, the stress of force between two objects may be measured. In a second method, shown in FIG. 6, the fiber optic microbend sensor 170 is first encapsulated in a material 180 and then embedded in a host material 190, such as a rubber roller cover, that surrounds a structure 200. Optical power is introduced and the reflected light is monitored with the detector (not shown) as a force is applied to the roller. In this case, stress or strain on a material is detected.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A flexible microbend device for attachment to an optical fiber, the device comprising:
    an upper bending element grid having at least one upper flexible element and wherein at least one upper interlocking member is positioned at an end of each upper flexible element;
    a lower bending element grid having at least one lower flexible element and wherein at least one lower interlocking member is positioned at an end of each lower flexible element; and
    wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid.

2. A flexible microbend device according to claim 1, wherein each flexible element is prepared from a material selected from the group consisting of: a moldable plastic; micromachined silicon; an elastomer; and silica fiber.

3. A flexible microbend device according to claim 2, wherein the silica fiber is a coated optical fiber.

4. A fiber optic microbend sensor comprising:
    a flexible microbend device comprising an upper bending element grid having at least one upper flexible element and wherein at least one upper interlocking member is positioned at an end of each upper flexible element; and a lower bending element grid having at least one lower flexible element and wherein at least one lower interlocking member is positioned at an end of each lower flexible element;
    an optical fiber positioned between each upper flexible element of the upper bending element grid and each lower flexible element of the lower bending element grid; and
    wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid to form a sensor.

5. A fiber optic microbend sensor according to claim 4, wherein the optical fiber is a multimode optical fiber and wherein each upper bending element grid and each lower bending element grid each comprise a plurality of flexible elements, each flexible element spaced apart by a periodic distance $\Lambda$, wherein $\Lambda$ is defined by the equation:

$$\Lambda = \frac{\pi a}{(\Delta)^{\frac{1}{2}}}$$

$$\Delta = \frac{n_1^2 - n_2^2}{2n_1^2}$$

where: a=radius of the core of the optical fiber
    $n_1$=core refractive index
    $n_2$=cladding refractive index.

6. A fiber optic microbend sensor according to claim 4, wherein each flexible element is prepared from a material selected from the group consisting of: a moldable plastic; micromachined silicon; an elastomer; and silica fiber.

7. A fiber optic microbend sensor according to claim 4, wherein the sensor is encapsulated in a material having mechanical properties that are different from those of the flexible elements.

8. A fiber optic microbend sensor according to claim 4, wherein the sensor is encased in a protective covering.

9. A fiber optic microbend sensor according to claim 8, wherein the protective covering is a vacuum bag.

10. A fiber optic microbend sensor according to claim 4, wherein the optical fiber is a single mode optical fiber and wherein each upper bending element grid and each lower bending element grid each comprise a plurality of flexible elements, each flexible element is spaced apart by a periodic distance $\Lambda$, where $10\ \mu m \leq \Lambda \leq 1500\ \mu m$.

11. A fiber optic microbend sensor array comprising a plurality of flexible microbend devices attached to an optical fiber, wherein each flexible microbend device comprises: an upper bending element grid having at least one upper flexible element and wherein at least one upper interlocking member is positioned at an end of each upper flexible element; a lower bending element grid having at least one lower flexible element and wherein at least one lower interlocking member is positioned at an end of each lower flexible element; and wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid.

12. A fiber optic microbend sensor comprising:
a flexible microbend device comprising an upper bending element grid having at least one flexible element; and a lower bending element grid having at least one flexible element and wherein each flexible element comprises a polyurethane elastomer;
an optical fiber positioned between each flexible element of the upper bending element grid and each flexible element of the lower bending element grid; and
wherein each flexible element of the upper bending element grid alternately engages each flexible element of the lower bending element grid to form a sensor.

13. A fiber optic microbend sensor comprising:
a flexible microbend device comprising an upper bending element grid having at least one flexible element; and a lower bending element grid having at least one flexible element;
an optical fiber positioned between each flexible element of the upper bending element grid and each flexible element of the lower bending element grid; and
wherein each flexible element of the upper bending element grid alternately engages each flexible element of the lower bending element grid to form a sensor, wherein the sensor is encapsulated in a material having mechanical properties that are different from those of the flexible elements and wherein the encapsulated material is selected from the group consisting of: silicone RTV; UV-cured epoxy; an elastomer; and polyurethane.

14. A fiber optic microbend sensor comprising:
a flexible microbend device comprising an upper bending element grid having at least one upper flexible element and wherein at least one upper interlocking member is positioned at an end of each upper flexible element; and a lower bending element grid having at least one lower flexible element and wherein at least one lower interlocking member is positioned at an end of each lower flexible element;
an optical fiber positioned between each upper flexible element of the upper bending element grid and each lower flexible element of the lower bending element grid;
wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid to form a sensor;
an optical coupler having a first end coupled to the optical fiber;
a light source coupled to a second end of the optical coupler;
a detector coupled to a third end of the optical coupler; and
a reflector positioned at an end of the optical fiber opposite from the light source.

15. A fiber optic microbend sensor according to claim 14, further comprising a fused, biconical, tapered device disposed between the optical coupler and the detector, wherein the fused, biconical, tapered device separates high and low order modes from an optical signal.

16. A method for measuring stress of force between two objects, the method comprising the steps of:
a) providing a fiber optic microbend sensor comprising:
a flexible microbend device comprising an upper bending element grid having at least one upper flexible element and wherein at least one upper interlocking member is positioned at an end of each upper flexible element; and a lower bending element grid having at least one lower flexible element and wherein at least one lower interlocking member is positioned at an end of each lower flexible element;
an optical fiber positioned between each upper flexible element of the upper bending element grid and each lower flexible element of the lower bending element grid;
wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid to form a sensor;
an optical coupler having a first end coupled to the optical fiber;
a light source coupled to a second end of the optical coupler;
a detector coupled to a third end of the optical coupler; and
a reflector positioned at an end of the optical fiber opposite from the light source;
b) attaching the fiber optic microbend sensor to a surface of a structure;
c) introducing optical power to the fiber optic microbend sensor; and
d) monitoring reflected light with the detector.

17. A method for measuring stress or strain of a material, the method comprising the steps of:
a) providing a fiber optic microbend sensor comprising:
a flexible microbend device comprising an upper bending element grid having at least one upper flexible element and wherein at least one upper interlocking member is positioned at an end of each upper flexible element; and a lower bending element grid having at least one lower flexible element and wherein at least one lower interlocking member is positioned at an end of each lower flexible element;
an optical fiber positioned between each upper flexible element of the upper bending element grid and each lower flexible element of the lower bending element grid;
wherein each upper interlocking member mates with each respective lower flexible element and each lower interlocking member mates with each respective upper flexible element, wherein the upper bending element grid alternately engages each flexible element of the lower bending element grid and wherein the lower bending element grid alternately engages each flexible element of the upper bending element grid to secure the upper bending element grid to the lower bending element grid to form a sensor;

an optical coupler having a first end coupled to the optical fiber;

a light source coupled to a second end of the optical coupler;

a detector coupled to a third end of the optical coupler; and a reflector positioned at an end of the optical fiber opposite from the light source;

b) embedding the fiber optic microbend sensor in a host material;

c) introducing optical power to the fiber optic microbend sensor; and d) monitoring reflected light with the detector.

* * * * *